United States Patent
Zhu

(10) Patent No.: US 10,397,369 B2
(45) Date of Patent: Aug. 27, 2019

(54) METHODS AND NETWORK NODES FOR MONITORING SERVICES IN A CONTENT DELIVERY NETWORK

(71) Applicants: TELEFONAKTIEBOLAGET LM ERICSSON (PUBL), Stockholm (SE); Zhongwen Zhu, Saint-Laurent, Québec (CA)

(72) Inventor: Zhongwen Zhu, Saint-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 132 days.

(21) Appl. No.: 15/532,292

(22) PCT Filed: Dec. 5, 2014

(86) PCT No.: PCT/IB2014/066653
§ 371 (c)(1),
(2) Date: Jun. 1, 2017

(87) PCT Pub. No.: WO2016/087908
PCT Pub. Date: Jun. 9, 2016

(65) Prior Publication Data
US 2017/0331922 A1    Nov. 16, 2017

(51) Int. Cl.
*G06F 13/00* (2006.01)
*H04L 29/08* (2006.01)
(Continued)

(52) U.S. Cl.
CPC ........ *H04L 67/327* (2013.01); *H04L 41/0896* (2013.01); *H04L 41/5032* (2013.01);
(Continued)

(58) Field of Classification Search
CPC ... H04L 43/04; H04L 41/0896; H04L 67/327; H04L 41/5032; H04L 43/0882;
(Continued)

(56) References Cited

U.S. PATENT DOCUMENTS 9,325,745 B2 *   4/2016  Toyama ................. G06Q 30/06
10,116,697 B2 * 10/2018  Beckman .............. H04L 63/105
(Continued)

OTHER PUBLICATIONS

International Search Report, dated Aug. 14, 2015; 4 pages.
Content delivery network from Wikipedia; uploaded from the Internet on Jul. 24, 2015; 8 pages.

*Primary Examiner* — Kenneth R Coulter
(74) *Attorney, Agent, or Firm* — Haizhen Jin; Ericsson Canada Inc.

(57) ABSTRACT

A method for monitoring services, in a content delivery network (CDN), having a plurality of delivery nodes used to deliver services requested by end-users comprises: instructing the plurality of delivery nodes to associate identifiers to service requests, when the service requests arrive at any of the plurality of delivery nodes, the identifiers being logged with their associated service requests in log files; sending a request to a log collector for log information, the request including a service ID corresponding to a service to be monitored; receiving the log information corresponding to the services to be monitored, based on the service ID and the associated identifier; and based on the received log information, determining a required bandwidth for delivering the service to be monitored. Also, network nodes for carrying out this method are disclosed.

20 Claims, 12 Drawing Sheets

(51) Int. Cl.
*H04L 12/26* (2006.01)
*H04L 12/24* (2006.01)

(52) U.S. Cl.
CPC ...... *H04L 41/5035* (2013.01); *H04L 41/5051* (2013.01); *H04L 43/04* (2013.01); *H04L 43/0817* (2013.01); *H04L 43/0882* (2013.01); *H04L 41/5096* (2013.01); *H04L 43/0888* (2013.01); *H04L 43/16* (2013.01)

(58) Field of Classification Search
CPC ............. H04L 43/0817; H04L 41/5051; H04L 43/0888; H04L 43/16; H04L 41/5096; H04L 41/5035
USPC ................ 709/224, 217–219, 245, 241, 242, 709/231–235
See application file for complete search history.

(56) References Cited

U.S. PATENT DOCUMENTS

| | | |
|---|---|---|
| 2008/0092058 A1 | 4/2008 | Afergan et al. |
| 2009/0210528 A1 | 8/2009 | Swildens et al. |
| 2011/0196978 A1* | 8/2011 | Toyama ................. G06Q 30/06 709/229 |
| 2012/0246306 A1 | 9/2012 | Douglis et al. |
| 2015/0089673 A1* | 3/2015 | Beckman .............. H04L 63/105 726/29 |
| 2015/0370847 A1* | 12/2015 | Kondoh ................. G06F 17/40 707/691 |
| 2017/0228843 A1* | 8/2017 | Castilla .............. G06Q 30/0201 |
| 2018/0278712 A1* | 9/2018 | Zhu ..................... H04L 67/2842 |

\* cited by examiner

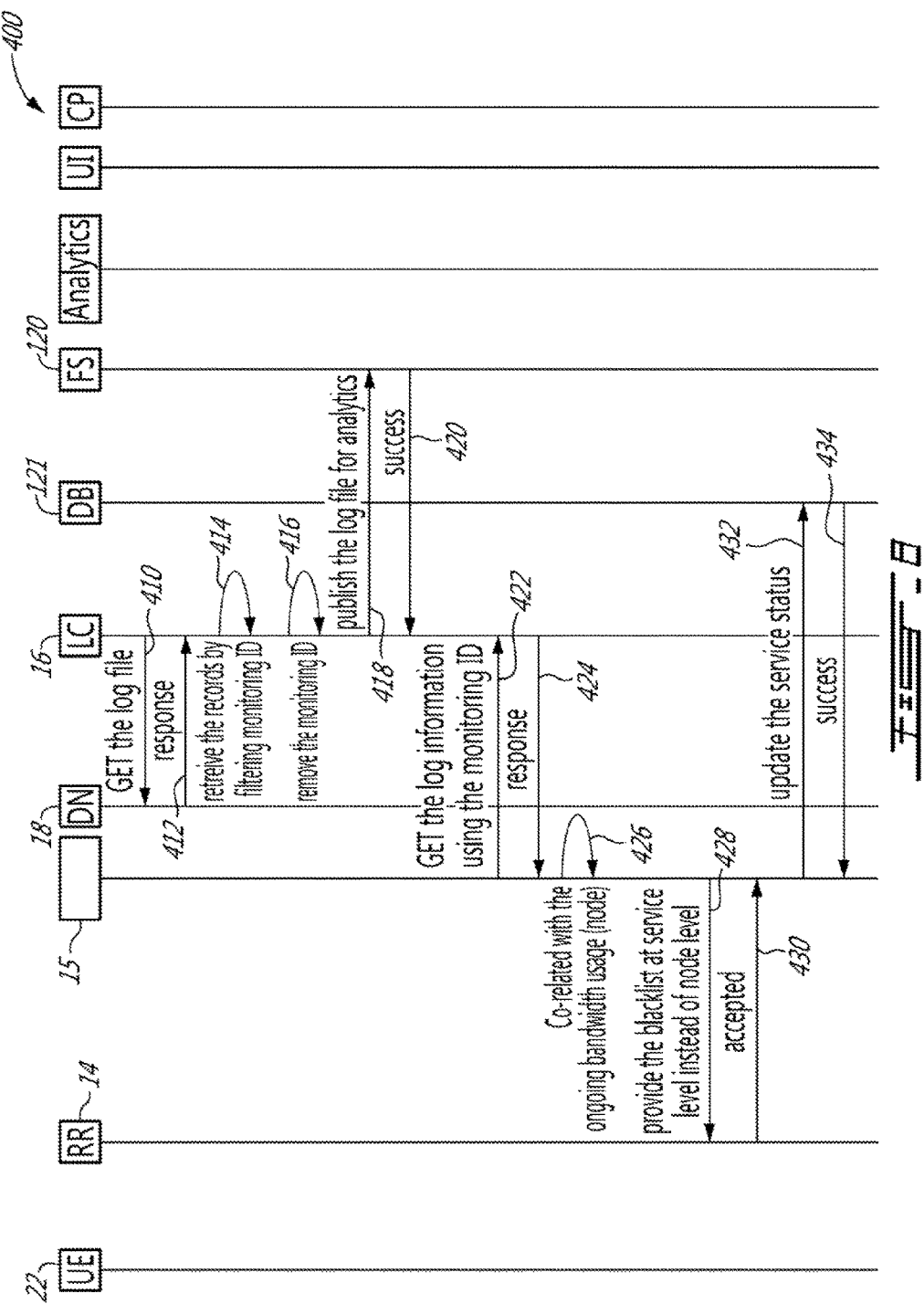

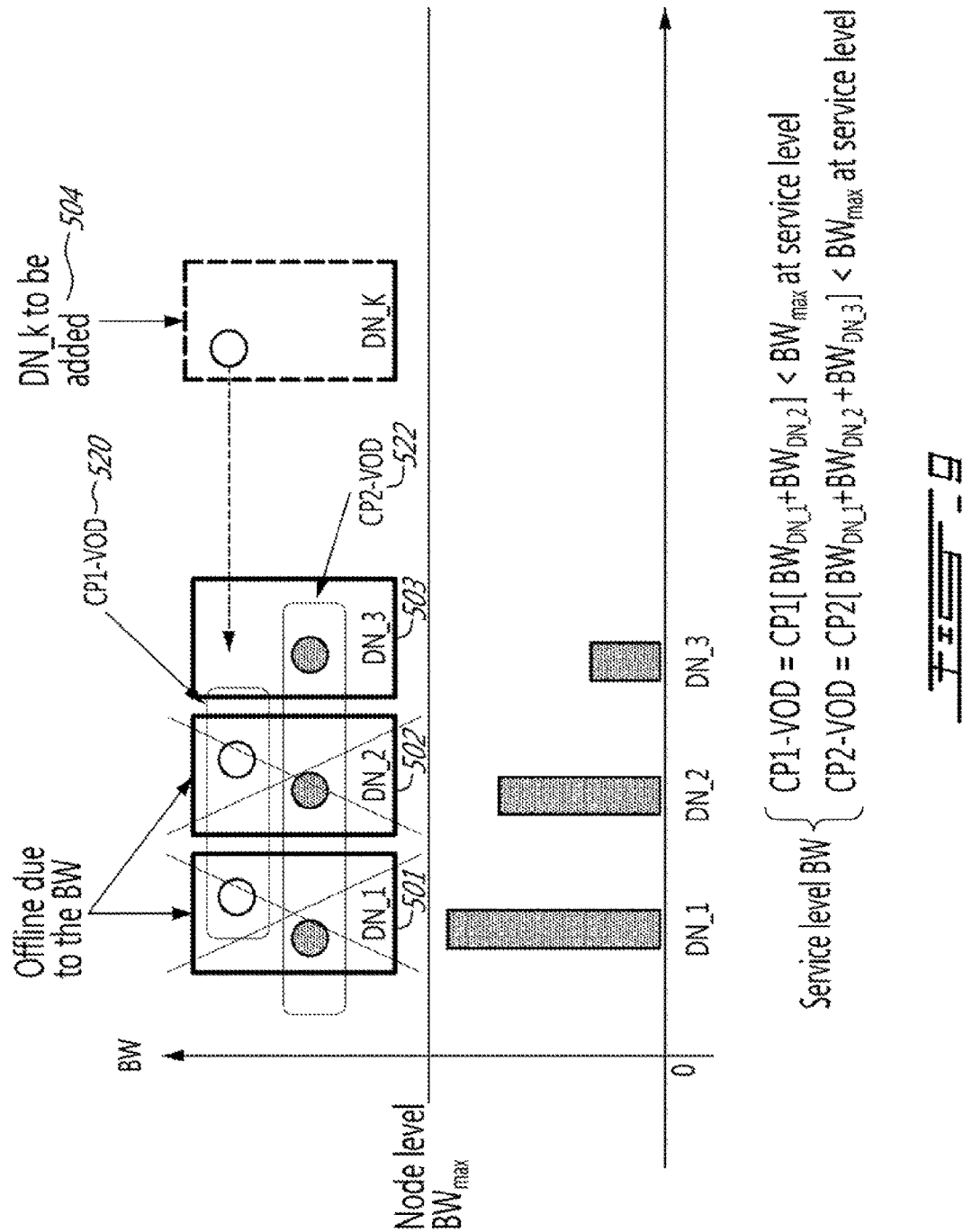

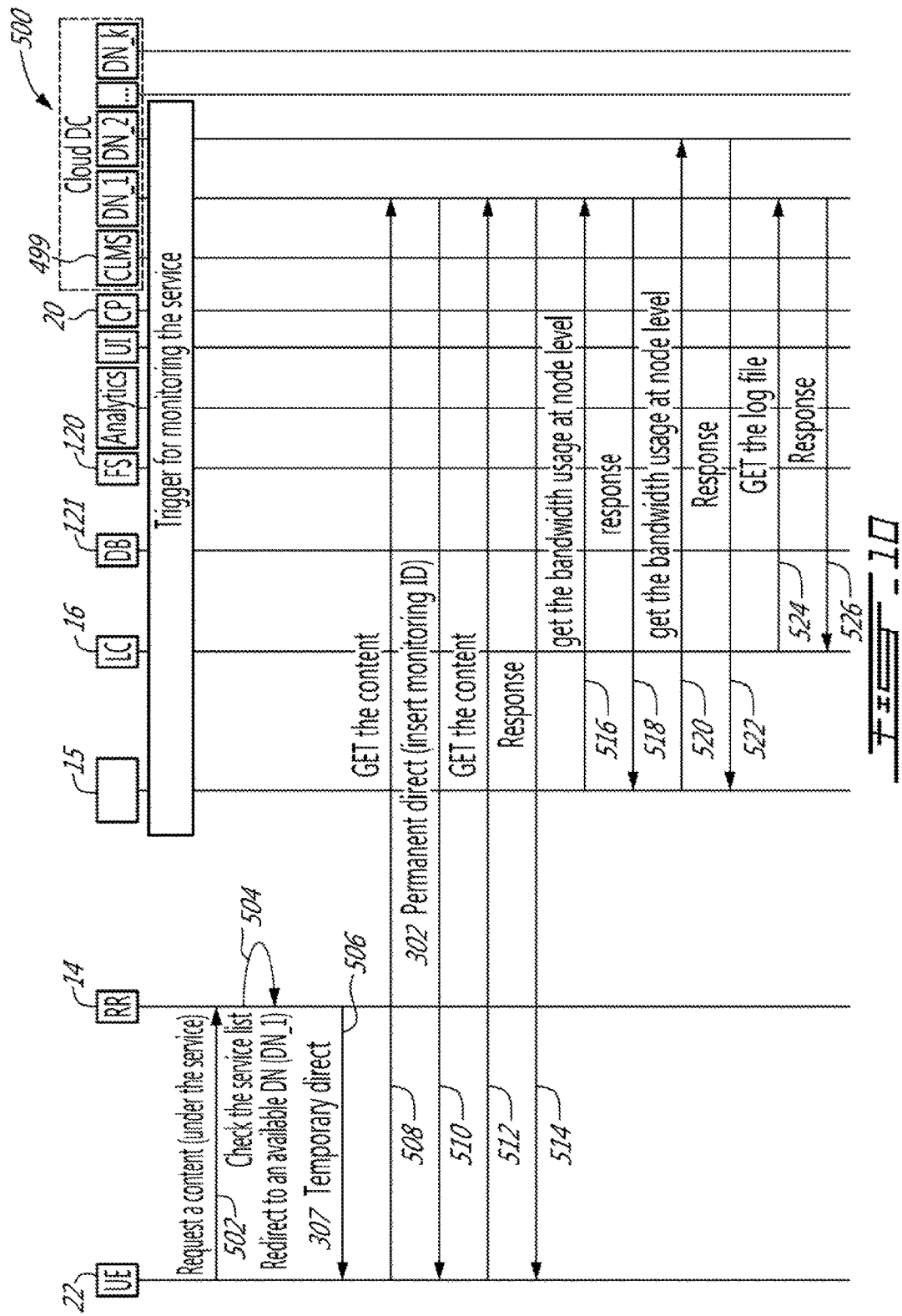

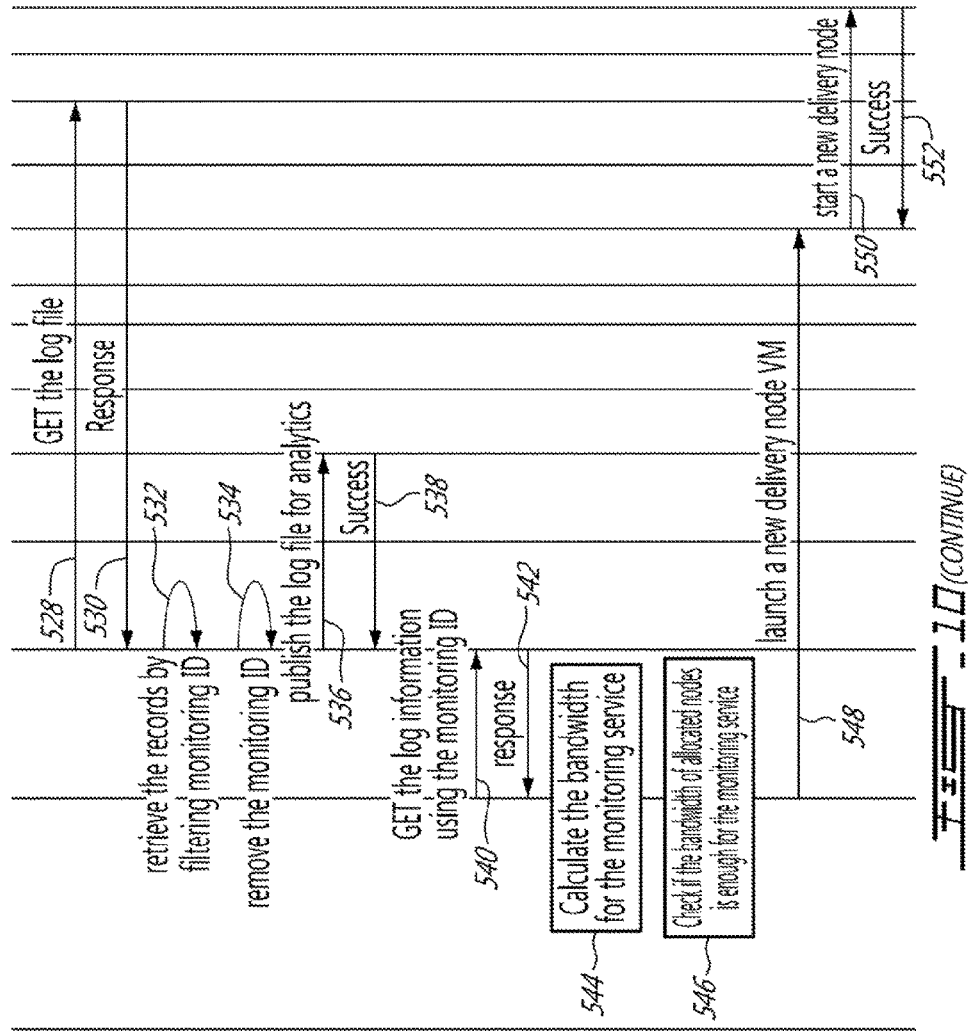

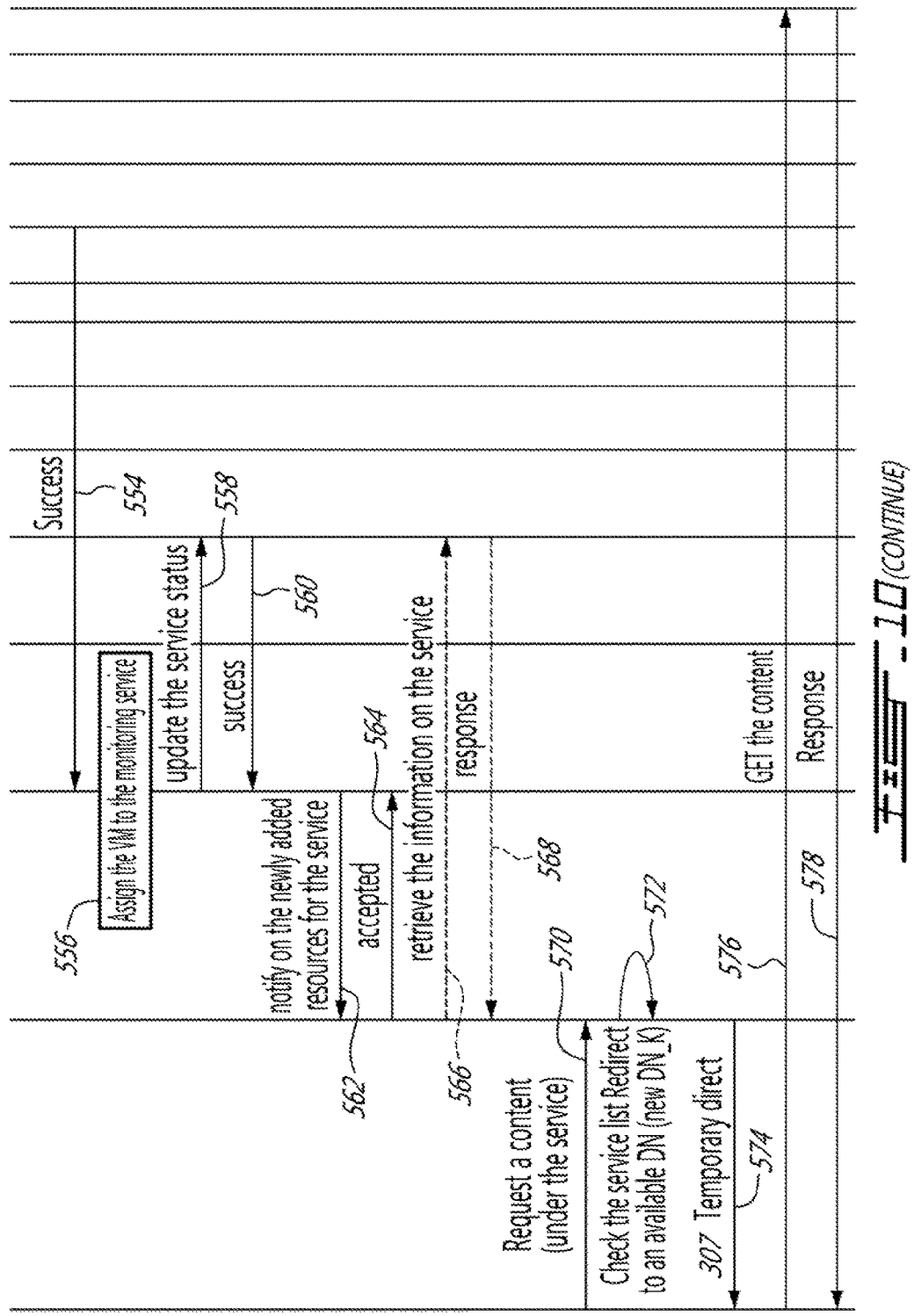
FIG. 10 (CONTINUE)

METHODS AND NETWORK NODES FOR MONITORING SERVICES IN A CONTENT DELIVERY NETWORK

TECHNICAL FIELD

This disclosure relates generally to methods and network nodes for monitoring services in a content delivery network.

BACKGROUND

A content delivery network or content distribution network (CDN) is a large distributed system of servers deployed in multiple datacenters across the Internet and the globe. CDNs are used to deliver content, including web objects (texts, graphics and scripts), downloadable objects (media files, software, software upgrades, documents, etc.), applications (e-commerce, portals, etc.), live streaming media, on-demand videos, web accelerations, and social networks, for example. The delivery of content to end-users should be done with high availability and high performance.

Content providers (CPs), such as media companies and e-commerce vendors, pay CDN operators to deliver their content to end-users. In turn, an operator of a CDN pays Internet Service Providers (ISPs), carriers, network operators and cloud owners, for hosting its servers in their datacenters.

For example, FIG. 1 shows a conventional communication system 10 including a CDN 12. The CDN 12 includes a request router (RR) 14, a CDN monitoring node 15, a log collector (LC) 16, and a plurality of delivery nodes 18. Of course, a person skilled in the art will appreciate that a CDN may comprise other elements, such as databases, for performing their standard procedures and functions. The plurality of delivery nodes 18 are usually deployed at both the edge and core networks to deliver contents to end-users.

The CDN 12 typically has an agreement with or is owned by a content provider (CP) 20, for delivering content to end-users. The CP 20 has a content portal, from which an end-user device 22 can browse and request contents or services, for example. Once the end-user selects a specific content or service, a request for the service is sent to the RR 14. The RR 14 selects one or more delivery nodes 18 that are best suitable for serving the end-user. For example, the RR 14 can dynamically redirect service requests to a delivery node 18 located closer to an end-user issuing the requests. The redirection or selection of a delivery node is done based on a list of available delivery nodes, which are given by the CDN monitoring node 15. More specifically, the CDN monitoring node 15, which can be connected to the RR 14 or be co-located with the RR 14, dynamically calculates which available delivery node from the list 18 is located closest to the requesting end-user and transmits the list of delivery nodes to the RR 14. The calculations help to reduce the distance that contents have to travel, and the number of hops that data packets need to make. As a result, packet loss, jitter and latency are reduced, while user experience is improved.

The delivery nodes 18 have cache servers, in which copies of different contents and services are stored. Furthermore, each delivery node 18 produces log files or access log files. Every time that a service request is received, the delivery node 18 accesses the log file to record the service request. The log file can be used for analytics, billing and data mining, etc. More specifically, the LC 16 collects the log files from each delivery node 18 and reformats them for analytics and audit purposes.

Typically, there are two kinds of logs, one is an access log, and the other one is a session log. Each log might have different formats that can be standard (e.g. icecast, apache) or customized.

For an access log, it logs the incoming Uniform Resource Locator (URL) when the service request accesses the delivery node. The delivery node produces one or few large access log files. For a session log, it logs all the incoming URLs within the same session into a single file. Normally the delivery node produces many small session log files.

In order to efficiently utilize the delivery nodes, the RR 14 needs to have accurate information and knowledge about the availability of the delivery nodes. However, due to the structure of the CDN and the dynamic nature of the services, it is not easy to have an accurate picture of the availability of the delivery nodes. For example, current systems pre-assign bandwidth to services from different content providers. Since services can be added or removed dynamically, some services can be blocked even if some delivery nodes still have bandwidth or some delivery nodes could be blacklisted even though they were assigned to a particular service.

Therefore, it would be desirable to provide a system and a method that obviate or mitigate the above described problems.

SUMMARY

In a first aspect of the present invention, there is provided a method for monitoring services, in a content delivery network (CDN), having a plurality of delivery nodes used to deliver services requested by end-users, each service being identified by a service identity (ID). The method comprises: instructing the plurality of delivery nodes to associate identifiers to service requests, when the service requests arrive at any of the plurality of delivery nodes, the identifiers being logged with their associated service requests in log files; sending a request to a log collector for log information, the request including a service ID corresponding to a service to be monitored; in response to the request, receiving the log information corresponding to the service to be monitored based on the service ID and the associated identifier; and based on the received log information, determining a required bandwidth for delivering the service to be monitored.

In a second aspect of the present invention, there is provided a network node for monitoring services, in a content delivery network, having a plurality of delivery nodes used to deliver services requested by end-users, each service being identified by a service identity (ID). The network node comprises: an instructing module for instructing the plurality of delivery nodes to associate identifiers to service requests, when the service requests arrive at any of the plurality of delivery nodes, the identifiers being logged with their associated service requests in log files; a requesting module for sending a request to a log collector for log information, the request including a service ID corresponding to a service to be monitored; a receiving module for receiving the log information corresponding to the service to be monitored, based on the service ID and the associated identifier; and a determining module for determining a required bandwidth for delivering the service to be monitored, based on the received log information.

In a third aspect of the present invention, there is provided a network node for monitoring services, in a content delivery network, having a plurality of delivery nodes used to deliver services requested by end-users, each service being identified by a service identity (ID). The network node comprises circuitry adapted to cause the network node to: instruct the plurality of delivery nodes to associate identifiers to service requests, when the service requests arrive at any of the plurality of delivery nodes, the identifiers being logged with their associated service requests in log files; send a request to a log collector for log information, the request including a service ID corresponding to a service to be monitored; receive the log information corresponding to the service to be monitored, based on the service ID and the associated identifier; and determine a required bandwidth for delivering the service to be monitored, based on the received log information.

In an embodiment of the third aspect, the circuitry comprises a processing unit an interface and a memory, the memory containing instructions that, when executed, cause the processing unit to: instruct the plurality of delivery nodes to associate identifiers to service requests, when the service requests arrive at any of the plurality of delivery nodes, the identifiers being logged with their associated service requests in log files; send a request to a log collector for log information, the request including a service ID corresponding to a service to be monitored; receive the log information corresponding to the service to be monitored, based on the service ID and the associated identifier; and determine a required bandwidth for delivering the service to be monitored, based on the received log information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 8 illustrates a flow diagram of an exemplary method for retrieving log files produced by delivery nodes of a CDN for service monitoring, according to an embodiment of the present invention;

FIG. 9 shows an example of bandwidth for delivering services in some delivery nodes; and FIG. 10 illustrates a flow diagram of a detailed example of service monitoring in the communication network of FIG. 2, according to an embodiment of the present invention.

DETAILED DESCRIPTION

Figure 1:
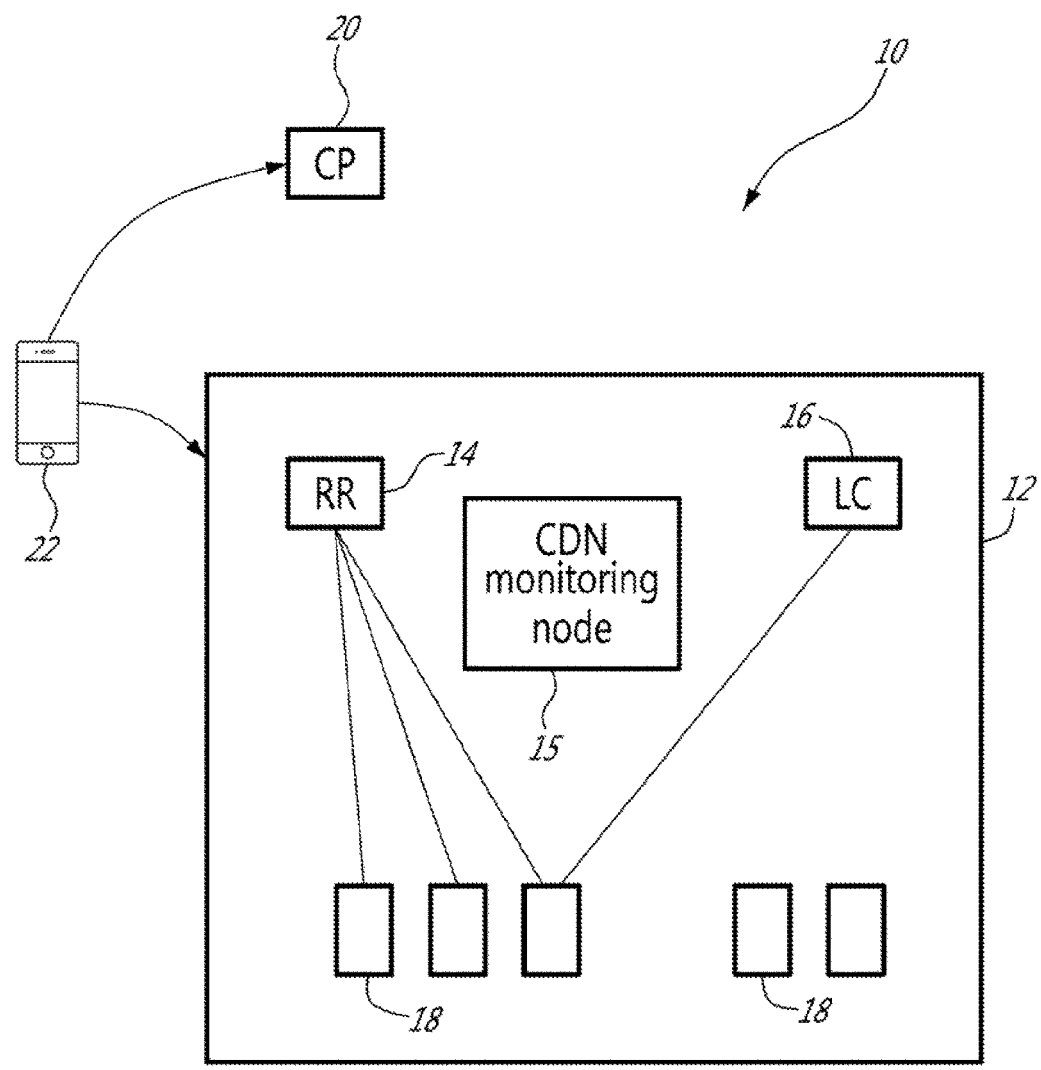
FIG. 1 is a prior art of a communication system comprising a standard CDN.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As mentioned hereinabove, in order for a CDN to work properly and to efficiently utilize the resources in the CDN, an accurate view on the availability of the plurality of delivery nodes is required. In current systems, only node level monitoring is performed, i.e. monitoring the bandwidth usage of a delivery node, in terms of CPU capacity, memory, etc. There is no consideration of service level monitoring.

For example, multiple services can run on a single delivery node. The services can be added or removed dynamically. Moreover, the same delivery node can have one or more accounts and the number of services varies from one account to another. More specifically, bandwidth of delivery nodes is shared (e.g. pre-assigned to) with each content provider, for delivering their services. However, due to the dynamic nature of the services, it is not easy to guarantee the bandwidth for the services, because some services may take more bandwidth than other. As such, a service can be blocked because a delivery node has reached its maximum bandwidth capacity even though the service is supposed to be guaranteed for a certain bandwidth. Embodiments of the present invention allow for solving such a problem.

In terms of terminology, if an end-user clicks on the following link: www.youtube.com/video/episode1, YouTube™ represents the account, video represents the service, and epidsode 1 represents the asset under the service. There may be many assets under a service, e.g. there may be episode 2, 3, 4, etc.

The CDN monitoring node 15 could be used to monitor the services running on a delivery node. To do so, it has to connect and communicate with the delivery node. But those connections will consume bandwidth of the delivery node. It is, thus, a challenge to monitor all the services without having an impact on the delivery node's traffic load. In other words, it is a challenge to design a mechanism to monitor the bandwidth usage at service level instead of node level.

Also, in current systems, the CDN monitoring node 15 and the LC 16 work independently. The CDN monitoring node 15 is used to select a delivery node for the RR 14 to redirect the service request to and the LC 16 is used to collect log files produced by each delivery node for analytics purposes.

Generally speaking, the present disclosure provides for a method and a network node for monitoring the CDN 12 at the service level, by defining a new interface between the CDN monitoring node 15 and LC 16. The new interface allows the CDN monitoring node 15 to retrieve the information that is logged by each DN 18. The information in the log files allows the CDN monitoring node 15 to monitor the bandwidth usage at the service level and provide the resource availability across the plurality of the DNs 18 for service delivery, to the RR 14.

Figure 2:
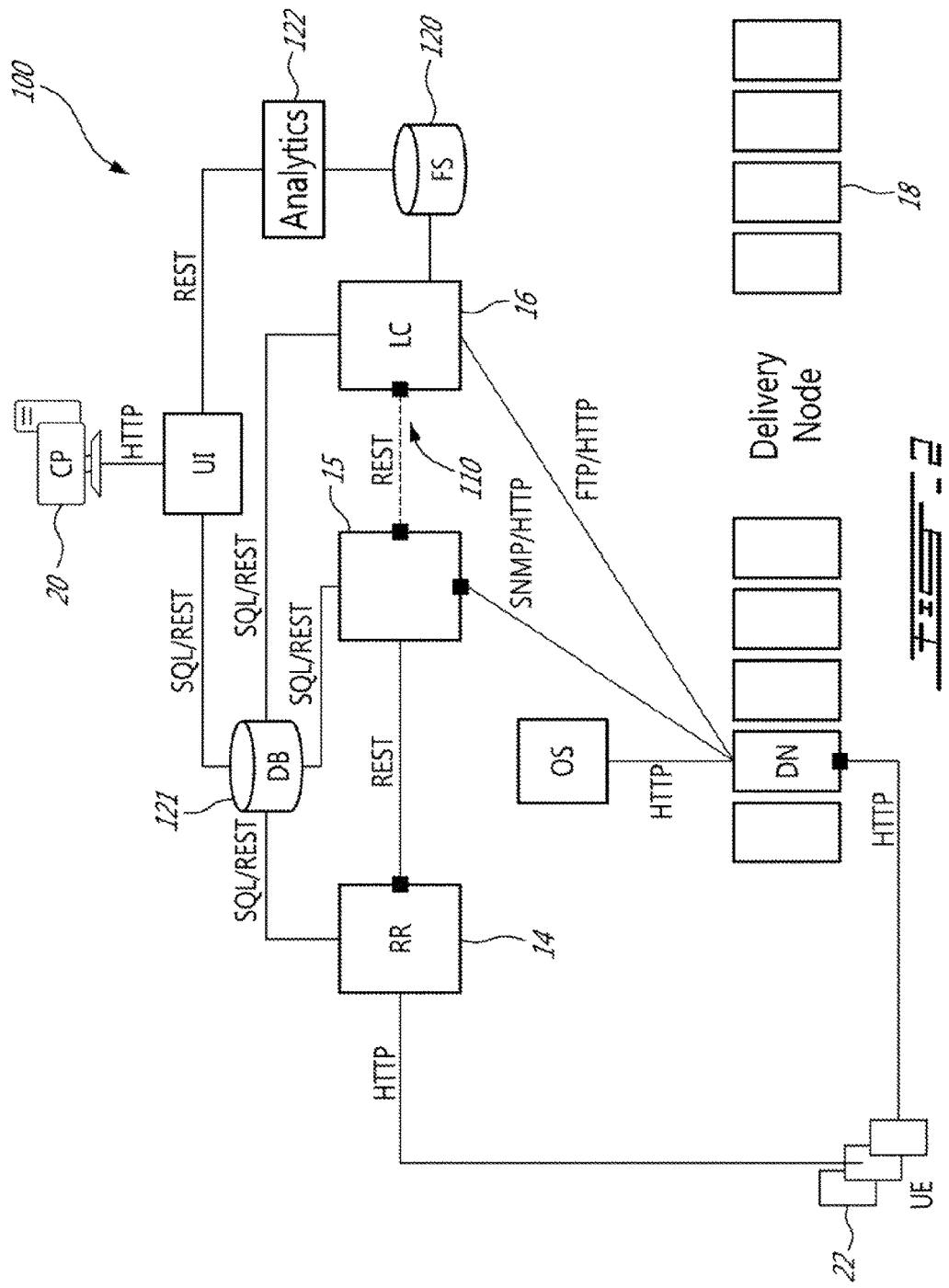
FIG. 2 is a block diagram of a communication system according to an embodiment of the present invention.

More specifically, FIG. 2 illustrates a communication system 100 according to an embodiment of the present invention.

Elements that are the same as those in FIG. 1 have the same reference numeral. The communication system 100 of FIG. 2 is similar to that of FIG. 1 except for the new interface 110 that is defined between the CDN monitoring node 15 and the LC 16. The presence of the interface 110 enables the service monitoring feature on the plurality of delivery nodes 18. Furthermore, FIG. 1 shows a file system (FS) 120 and a database (121).

The interface 110 can, for example, use the REpresentational State Transfer (REST) architecture to communicate between the CDN monitoring node 15 and the LC 16. Of course, it will be appreciated by a skilled person in the art that other architectures and protocols could be used for communication purposes.

The service monitoring feature can be enabled or disabled, based on the traffic load at the delivery node level. When the CDN monitoring node 15 detects that the bandwidth usage of a delivery node 18 is approaching a limit or load threshold, it will instructs the DN 18 to turn on the service monitoring feature. When the bandwidth usage at node level goes under the limit, the CDN monitoring node 15 will instruct the delivery nodes 18 to turn off the service monitoring feature. Other criteria could trigger the service monitoring feature as well. For example, this feature could be set by default instead of being based on the bandwidth of the node.

The communication system 100 of FIG. 2 further shows details of interactions between the content provider 20 and the CDN 12. For example, the LC 16 is connected to the file system (FS) 120, to which log information of the plurality of delivery nodes 18 is sent. The CP 20 can access the log information stored in the FS 120 in order to obtain analytics and statistics regarding the contents of the services provided by the CP 20. The CDN monitoring node 15 can communicate with the database 121, accessible by the CP 20. The statistics allow the CP 20 to know, for example, what service is the most popular among the end-users. The CDN monitoring node 15 can update the database 121 regarding a status of services running on the delivery nodes 18. For example, for a specific service, such as a video service, the database 121 contains the status of this service, which indicates which delivery nodes 18 are running this service. Also, it should be understood that, before using the delivery nodes 18 of the CDN 12, the CP 20 has an agreement with the CDN 12. For example, in this agreement, a number of delivery nodes 18 are pre-assigned (or allocated) to serve the services coming from the CP 20. FIG. 2 shows only one CP 20 connected to the CDN 12 as an example. Of course, there may be more than one CP 20 that are connected to the CDN 12.

In such a case, when the CDN monitoring node 15 selects a delivery node to deliver a service from a list of available delivery nodes, it will choose a delivery node 18 that is available and assigned to a particular CP 20, that offers the service.

Figure 3:
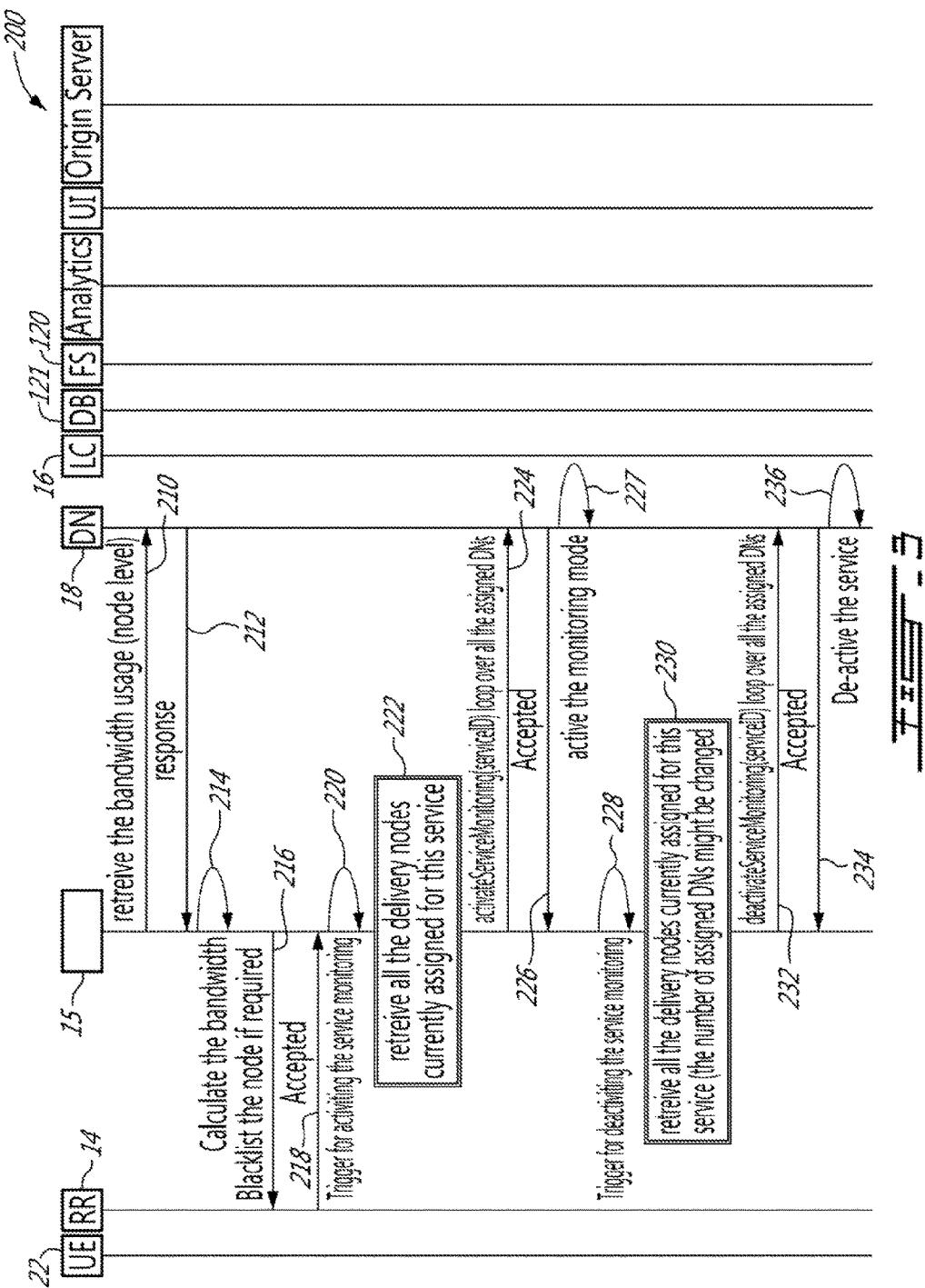
FIG. 3 is a flow diagram of a method for enabling/disabling the service monitoring feature, according to an embodiment of the present invention.

Now turning to FIG. 3, a flow diagram of a method 200 for enabling/disabling the service monitoring feature on the plurality of delivery nodes 18 in the CDN 12, will be described. FIG. 3 illustrates the interactions between the RR 14, the CDN monitoring node 15 and the plurality of delivery nodes 18.

Method 200 starts with step 210, where the CDN monitoring node 15 needs to monitor the bandwidth usage at node level of the plurality of delivery nodes 18. To do so, the CDN monitoring node 15 sends a request to the plurality of the delivery nodes 18 for retrieving the bandwidth usage information. The plurality of delivery nodes 18 have counters that store the bandwidth usage or an indication of the bandwidth usage of the delivery nodes 18.

In step 212, the plurality of delivery nodes 18 send to the CDN monitoring node 15 the content of their counters, in response to the request of step 210.

In step 214, the CDN monitoring node 15 calculates the current bandwidth usage for each DN 18 based on the bandwidth information collected from the counters of the DN 18. The types of calculations performed by the CDN monitoring node 15 to obtain the bandwidth usage are well-known in the art, thus they will not be described further.

In step 216, if it is determined that a specific DN 18 has reached its maximum bandwidth capacity, this DN 18 is put on a blacklist. The blacklist is updated and then sent to the RR 14 from the CDN monitoring node 15.

In step 218, the RR 14 replies back with a message indicating that the blacklist is accepted.

However, in step 220, if the calculated bandwidth usage at node level is approaching a limit or load threshold, e.g. 80% of the maximum bandwidth capacity, for a delivery node 18 assigned to a specific service, the CDN monitoring node 15 decides to trigger the service monitoring feature on this DN 18 to monitor the services running thereon.

To do so, in step 222, the CDN monitoring node 15 first retrieves the identity and other useful information of all the delivery nodes 18 that are currently assigned to the specific service. Then, in step 224, the CDN monitoring node 15 sends an instruction, in the form of a flag for example, to the delivery nodes 18, that have been identified as being currently assigned to the specific service, for activating the service monitoring feature. The instruction message contains a service ID, which allows to identify the specific service.

In step 226, the identified delivery nodes 18 reply back with an "accepted" message and activates the service monitoring feature, in step 227. The monitoring feature will mark or label each incoming service request with an identifier, such as a monitoring ID.

When the bandwidth usage at node level goes back under the given limit, based on bandwidth usage calculations, as described in steps 210 to 214, deactivation of the service monitoring feature is triggered, in step 228. It should be noted that the CDN monitoring node 15 regularly keeps monitoring the bandwidth of the delivery nodes 18 by sending the request to retrieve their bandwidth usage. For example, the request can be sent at each given time period, or other time intervals defined by the operator of the CDN 12. By keeping track of the bandwidth usage of the delivery nodes 18, the CDN monitoring node 15 can trigger the activation or deactivation of the service monitoring feature.

To deactivate the service monitoring service, in step 230, the CDN monitoring node 15 first retrieves the identity and other useful information about all the delivery nodes 18 currently assigned to the specific service. As a note, the number of assigned DNs might have changed from step 222. Then, the CDN monitoring node 15 sends an instruction to the DNs 18, which have been identified as being currently assigned to the service, to deactivate the service monitoring feature, in step 232.

In step 234, the identified DNs 18 replies back with an "accepted" message and in step 236, it deactivates the service monitoring feature.

As it can be seen in method 200, enabling and disabling the service monitoring feature is done automatically based on the traffic load of the delivery nodes 18. By so doing, the overall traffic handled within a CDN is improved.

Now, turning to FIG. 4, a method 250 for monitoring services in a CDN will be described.

It is assumed that the service monitoring feature has been enabled in the plurality of delivery nodes 18. The plurality of delivery nodes 18 have been identified as the delivery nodes assigned to a specific service for example. During the activation of the service monitoring feature, the service ID of the service to be monitored was sent from the CDN monitoring node 15 to the plurality of delivery nodes 18.

Method 250 starts with step 252, wherein the CDN monitoring node 15 instructs the plurality of DNs 18 to associate identifiers to service requests (or requests for a service) when the service requests arrive at any of the plurality of DNs 18. As an example, a service request or a request for a service could be requesting a video from YouTube™. The plurality of DNs 18 can add the identifiers to the incoming service requests. The identifiers can be indicators, flags, labels, marks, etc., as long as they allow to identify a requested service that needs to be monitored. The identifiers are logged in the log files along with their associated service requests. It should be noted that each of the service requests comprises a service ID corresponding to the requested service. The service ID is also logged with the service request. The identifiers and the service ID are used by the LC 16 to sort the information that the CDN monitoring node 15 is interested in, for example for specific services to be monitored. Also, information such as account and service asset information can be provided by the log files.

In step 254, the CDN monitoring node 15 sends a request to the LC 16 for log information, the request including a service ID corresponding to a service to be monitored.

In step 256, in response to the request, the CDN monitoring node 15 receives the log information corresponding to the service to be monitored, based on the service ID and the associated identifier. Typically, the log information comes from the delivery nodes 18 that have been assigned to the service to be monitored.

In step 258, based on the received log information, the CDN monitoring node 15 determines a required bandwidth for delivering the service to be monitored.

Figure 4:
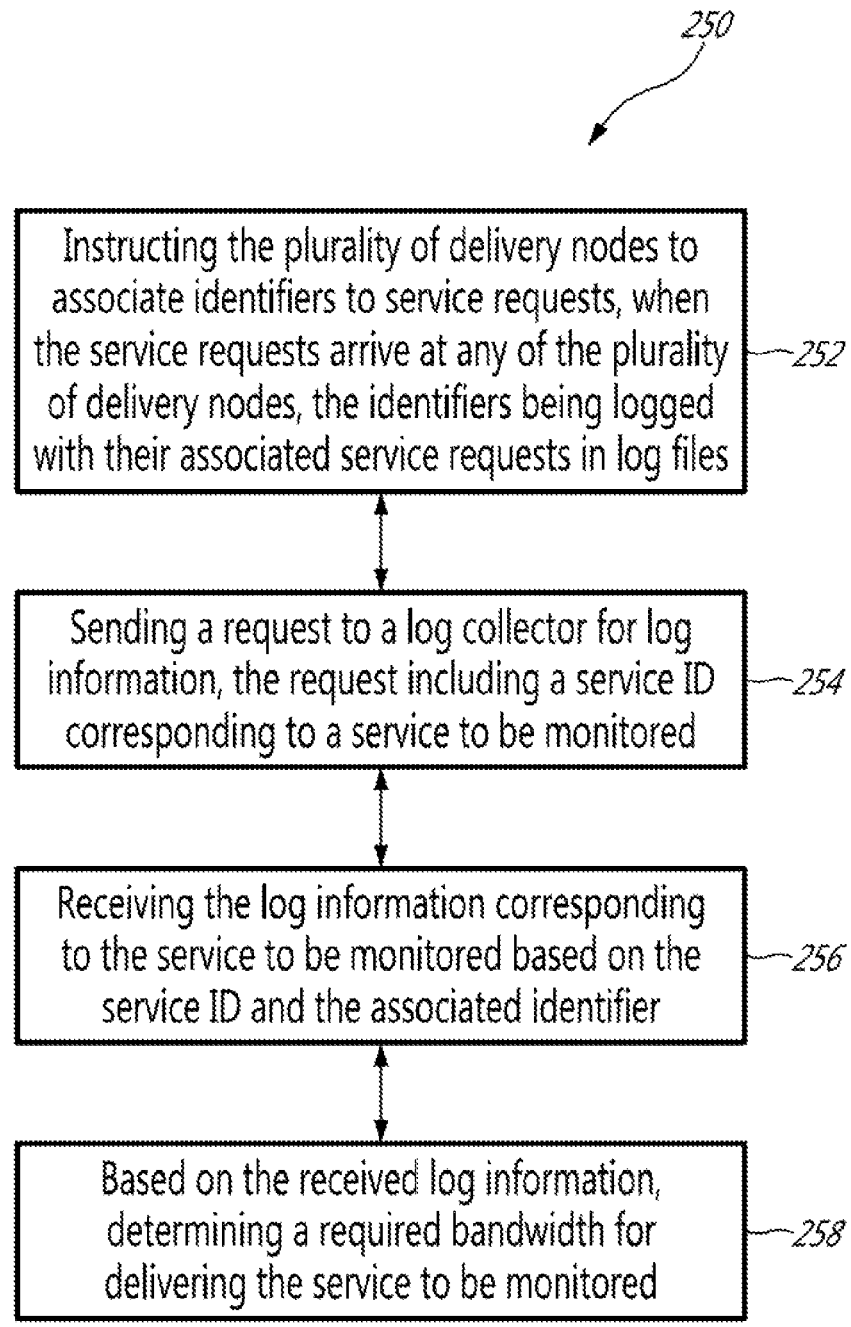
FIG. 4 is a flow chart of a method for service monitoring in a CDN, according to an embodiment of the present invention.
Figure 5:
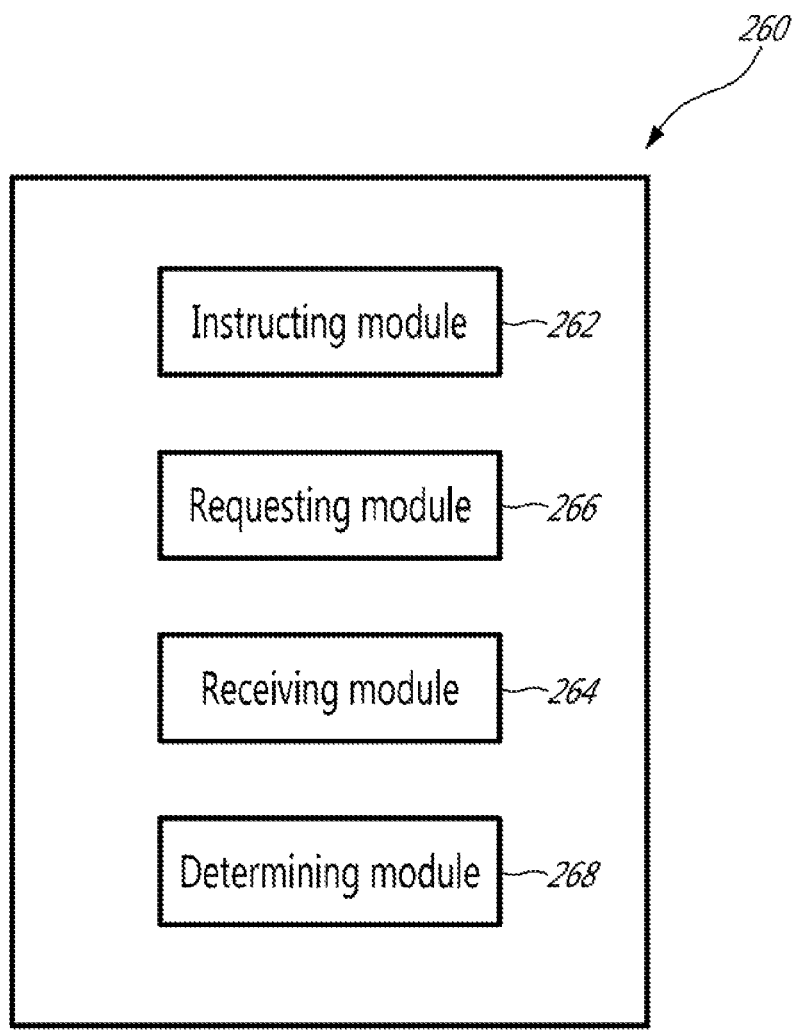
FIG. 5 is a schematic block diagram of a network node for service monitoring, according to an embodiment of the present invention.

In FIG. 5, a network node 260 according to an embodiment of the present invention, for carrying out method 250 of FIG. 4, will be described.

The network node 260 could be the CDN monitoring node 15, for example.

The network node 260 comprises an instructing module 262, a receiving module 264, a requesting module 266 and a determining module 268.

The instructing module 262 is used to instruct the plurality of DNs 18 to associate identifiers with service requests, when the service requests arrive at any of the plurality of DNs 18.

The requesting module 266 is used to request log information from the LC 16, the request including a service ID for a service to be monitored.

The receiving module 264 is used to receive the log information for the service to be monitored, based on the service ID and the associated identifier. And the determining module 266 is used to determine a required bandwidth for delivering the service to be monitored, based on the received log information. It should be noted that the network node may have other components, as will be appreciated by persons skilled in the art, to perform its standard procedures and functions.

Figure 6:
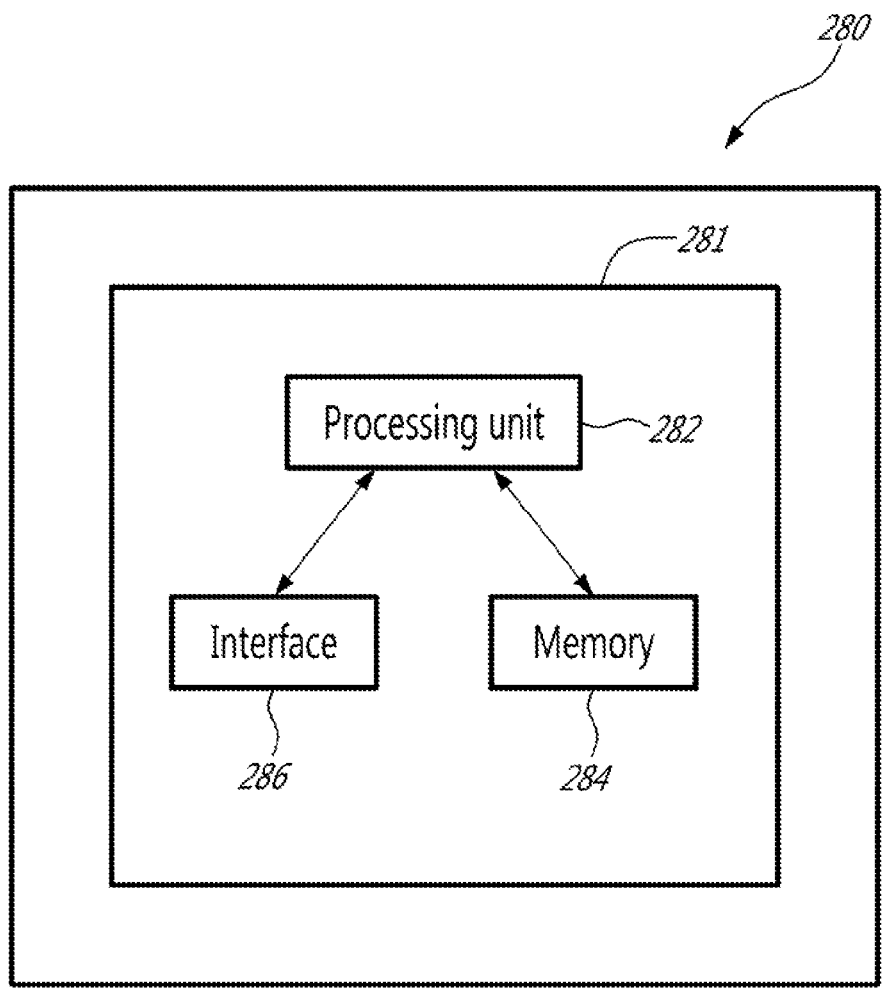
FIG. 6 is a schematic block diagram of a network node for service monitoring, according to another embodiment of the present invention.

FIG. 6 illustrates a network node 280, according to another embodiment of the present invention, for carrying out method 250 of FIG. 4.

The network node 280 could be the CDN managing node 15, for example.

The network node 280 comprises a circuitry 281, which has a processing unit 282, a memory 284 and an interface 286.

The processing unit 282 is in connection with the memory 284 and the interface 286. The memory 284 contains instructions that, when executed, cause the processing unit 282 to instruct the plurality of delivery nodes to associate identifiers to service requests, when the service requests arrive at any of the plurality of delivery nodes, the identifiers being logged with their associated service requests in log files; to send a request, using the interface 286, to a log collector for log information, the request including a service ID corresponding to a service to be monitored; to receive the log information corresponding to the service to be monitored, based on the service ID and the associated identifier; and based on the received log information, to determine a required bandwidth for delivering the service to be monitored. It should be noted that the processor unit 282 and the memory 284 could be collocated together or standalone. Also, it should be understood that the network node may have other components, as will be appreciated by persons skilled in the art, to perform its standard procedures and functions. Also, as can be seen from above, the circuitry is adapted to cause the network node 280 to perform the above different steps.

Figure 7:
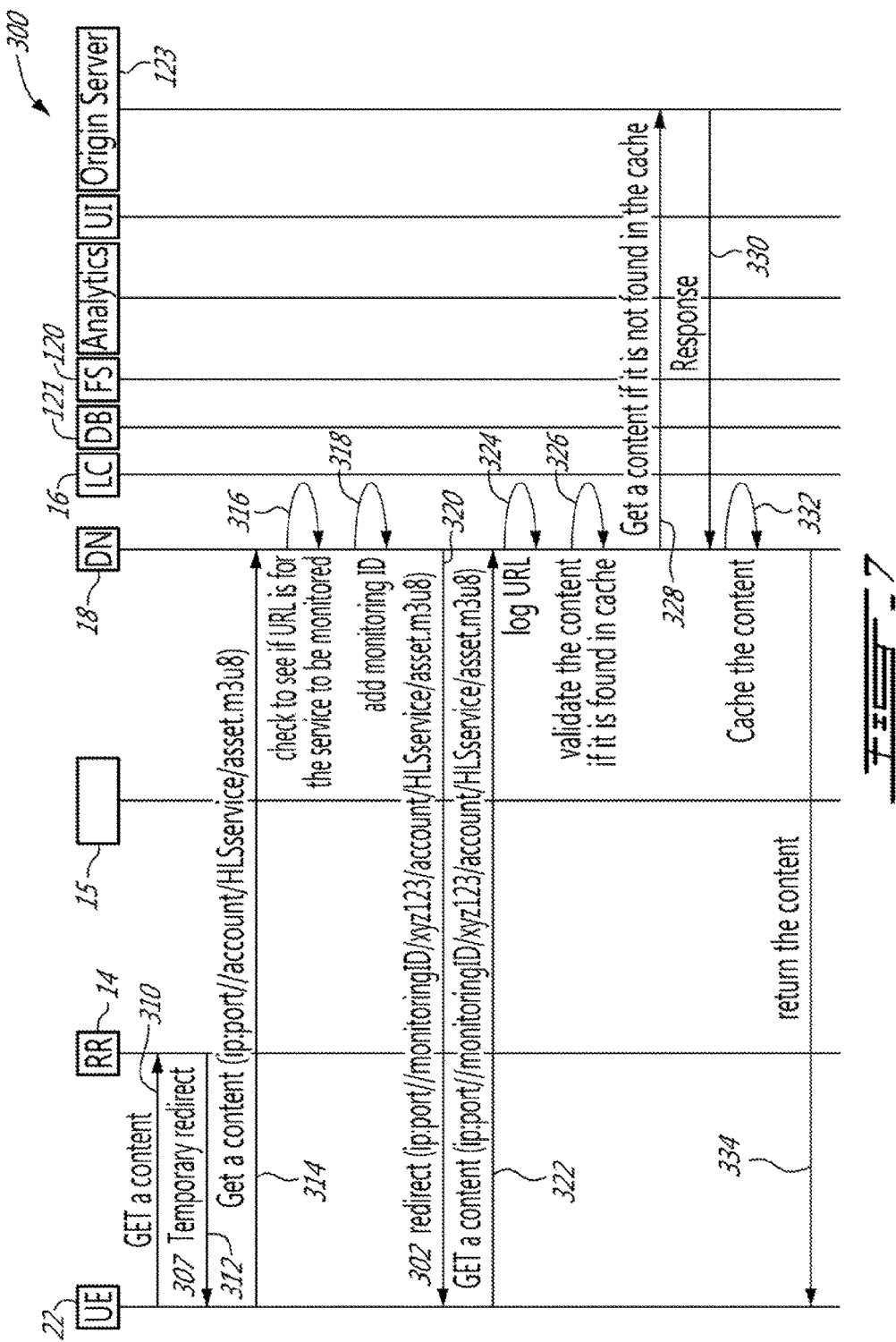
FIG. 7 is a flow diagram of an exemplary method for implementing the service monitoring feature, according to embodiment of the present invention.

In particular, FIG. 7 illustrates a flow diagram of an exemplary method 300 for triggering and implementing the service monitoring feature. This method involves an end-user device 22, the RR 14, the plurality of DNs 18, the CDN monitoring node 15, the FS 120 and an origin server 123 in the CP 20, for example.

At step 310, an end-user sends a request for a service or content to the RR 14, i.e. the end-user sends a HTTP GET request to the RR 14.

Based upon the location of the end-user and a list of available delivery nodes 18, the RR 14 selects one or more DNs 18 to serve the end-user's request. It sends the service request back to the end-user with the selected DNs's address, in step 312.

In step 314, the service request from the end-user is redirected to the selected DNs 18.

In step 316, after receiving the request, the selected DNs 18 check the Uniform Resource Locator (URL) in the service request to determine if the service requested is a service that has to be monitored or not. For example, the selected DNs 18 check if the service ID of the requested service is the same as the service ID received in step 224 of FIG. 3, sent by the CDN monitoring node 15 to the DNs 18 when activating the service monitoring feature. If yes, it means that this service needs to be monitored. To do so, the DNs 18 modify the HTTP response 32 before sending it back to the end-user. More particularly, the DNs 18 insert or add an identifier, called a monitoring ID for example, into the URL of the service request, in step 318. For example, the modified URL can be look like as follows: monitoringID/xyz123/network/account/service/asset.m3u8, where the service ID is 'xyz123' By so doing, the DNs 18 associate an identifier to a service request.

In step 320, the DNs 18 redirect the modified service request back to the end-user.

In step 322, the end-user sends back the modified service request to the DNs 18.

It should be noted that steps 320 and 322 are implementation examples. The DNs 18 could just receive the requested service and then deliver it to the end-user without sending the modified service request back to the end-user.

In step 324, once the DNs 18 receive the modified service request, the DNs 18 logs the modified URL from the service request in an access log file. This URL contains the identifier (e.g. monitoring ID) and the service ID, that can be used by the LC 16 to filter out information and perform analysis for the CDN monitoring node 15. For example, the LC 16 will sort out the records from the log files, based on the following string "/monitoringID/xyz123" for the specific service, whose has 'xyz123' as service ID.

In step 326, the DNs 18 check its cache to see if the requested service/content exists or not. If not, they contact the origin server 123 (in the CP 20, for example) to retrieve the requested content/service, in step 328. Then, in step 330, the origin server 123 replies back by sending the requested content/service to the DNs 18. Once the DNs 18 receive the requested content/service, it puts it in its cache, in step 332.

In step 334, the DNs 18 send the requested content/service to the end-user.

In order to monitor the services, from time to time, the LC 16 retrieves the log files from the plurality of delivery nodes 18. The frequency of retrieval is determined according to the size of the CDN 12 and other parameters, such as time intervals. The LC 16 uses the identifiers (e.g. monitoring IDs) and the service IDs to filter out the log records when parsing through the log files. Since the CDN monitoring node 15 can query the LC 16 about the log information for a specific service using the interface 110, it can then perform the selection of a delivery node, based on the log information retrieved by the LC 16.

More specifically, FIG. 8 illustrates a flow diagram for an exemplary method 400 for retrieving the log files produced by the delivery nodes 18, for service monitoring, according to an embodiment of the present invention. In this example, the service monitoring feature has been already activated on the delivery nodes 18 and implemented according to method 300 of FIG. 7. Therefore, different selected DNs 18 have been logging modified URLs (including identifiers and their associated service requests) from service requests in their access log files.

Method 400 starts with step 410, where from time to time or on a regular basis (on a given time period), the LC 16 sends a request to the DNs 18 to retrieve the access log files.

In response to the request, the DNs 18 send their access log files to the LC 16, in step 412.

Once the LC 16 receives the access log files, it retrieves the records for each service request by using the associated identifier and service ID, in step 414. The identifier and the service ID are found in the URL.

In step 416, the LC 16 removes the monitoring ID from the URLs. Since the identifiers are internal features, they are removed before sending the log information to an external system, like a file system.

In step 418, the LC 16 sends the log file, without the identifiers, to a file system 120 for analytics. If it is successful, the file system 120 sends a "success" message back to the LC 16, in step 420.

The CDN monitoring node 15 sends a request to the LC 16, in step 422, in order to get the log information for a specific service to be monitored, by using the service ID associated with the specific service.

In step 424, in response to the request, the LC 16 sends the records or log information associated with the specific identifier, based on the identifier and the service ID.

In step 426, upon receipt of the log information, the CDN monitoring node 15 performs a correlation between the received log information and the ongoing/current bandwidth usage at node-level. The log information includes indication of bandwidth usage by the service to be monitored. The correlation can show if the DN 18 has enough bandwidth to offer to the service to be monitored, given the ongoing bandwidth usage of the node and the indication of bandwidth usage for the service to be monitored.

In step 428, based on the correlation, the CDN monitoring node 15 can decide if certain services on a DN 18 should be blacklisted or not. For example, if a DN 18 is reaching the full bandwidth capacity of the delivery node or the bandwidth capacity allocated for the service to be monitored, then, this DN 18 will be blocked or this DN will be blocked only for the service to be monitored respectively. If any change is made in the blacklist, the CDN monitoring node 15 informs the RR 14. When the RR 14 receives the updated blacklist of DNs 18, it will block any requests for assets under the service to be monitored, for all the DNs 18 in the blacklist.

Now, turning to FIGS. 9 and 10, a detailed example of service monitoring in a communication network such as 100, having a CDN 12, will be described.

Let's assume that there are two content providers, CP1 and CP2, to which the CDN operator has agreed to offer a certain bandwidth. For example, for CP1, 100 Gbps are guaranteed and for CP2 1000 Gbps are guaranteed. Those are the predefined bandwidth for services from CP1 and CP2 respectively. It is also assumed that each delivery node 18 has a maximum bandwidth capacity of 400 Gbps, for example.

FIG. 9 shows a plurality of delivery nodes 18, e.g. DN_1 501, DN_2 502, DN_3 503 to serve the content providers CP1 and CP2. More specifically, suppose that the service 520 Video on Demand (VOD) from content provider 1 (CP1-VOD) is assigned to two delivery nodes, DN_1 501 and DN_2 502, for 50 Gbps each. The service 522 VOD of content provider 2 (CP2-VOD) is assigned to three nodes, DN_1 501, DN_2 502 and DN_3 503. Since services are dynamic, it may happen that for a moment, the service CP2-VOD 522 is distributed in the following manner: DN_1 501 offers 390 Gbps, DN_2 502 offers 350 Gbps and DN_3 503 offers 260 Gbps. For CP1-VOD 520, DN_1 501 can only offer 10 Gbps because its maximum bandwidth capacity is 400 Gbps, DN_2 502 offers 50 Gbps. The sum of the bandwidth usage (CP1-VOD 520 and CP2-VOD 522) on DN_1 501 is at the maximum bandwidth capacity. The sum of the bandwidth usage (CP1-VOD 520 and CP2-VOD 522) on DN_2 502 is at the maximum bandwidth capacity. With node level monitoring only, at this point, both DN_1 501 and DN_2 502 are blocked. And CP1-VOD 520 service is blocked completely, since DN_1 501 and DN_2 502 are blocked. Since DN_3 503 has not been assigned to CP1, it cannot be used to run CP1-VOD 520. However, CP1 has been guaranteed for 100 Gbps but is receiving only 60 Gbps. For such a case, CP1-VOD 520 will be blocked in current systems where monitoring at node level is performed.

However, with the service monitoring feature, as described in this disclosure, the CDN monitoring node 15 will be able to detect such a problem in advance and then make sure that the service CP1-VOD 520 will be offered. It should be noted that when activating the service monitoring feature, the CDN monitoring node 15 provides to the delivery nodes 18 the service ID corresponding to CP1-VOD 520.

The different steps for performing service monitoring in this example are illustrated in FIG. 10. More specifically, FIG. 10 shows the interactions between an end-user device 22, the RR 14, the CDN monitoring node 15, the LC 16, the database 121, the FS 120, a cloud manager system (CLMS) 499 and a plurality of DNs 18. It is assumed that the service monitoring feature has been already activated in the DNs 18.

In step 602, the end-user sends a request to the RR 14 for a content or service, such as CP1-VOD 520.

Once the RR 14 receives the service request, it checks a service list of available delivery nodes 18, in step 604. It selects an available DN 18, such as DN_1 501 and redirects the service request to that node. It is supposed that at this point DN_1 501 is available, i.e. the CP2-VOD 522 has not been requested yet.

To do so, the RR 14 sends a 307 temporary direct message to the end-user for redirecting the service request to DN_1 501, in step 606.

In step 608, once the end-user receives the redirect message, the request for service message is redirected to DN_1 501 in step 608.

Upon receipt of this redirect message, DN_1 501 associates an identifier (e.g. monitoring ID) with the request for a service or service request and sends a Permanent Direct message 302 to the end-user in step 610, this message comprising a modified URL.

As a result of receiving the permanent direct message, in step 612, the end-user sends back the service request to DN_1 501. In step 614, DN_1 501 responds back by providing the content of the service request.

The same steps are performed when a request for CP2-VOD 522 is received by the RR 14. Also, the same steps are repeated for DN_2 502 with regards to a request for CP1-VOD 520 and CP2-VOD 522.

In step 616, the CDN monitoring node 15 sends a request to DN_1 501 to get the current bandwidth usage at the node.

In step 618, DN_1 501 replies back with the current bandwidth usage to the CDN monitoring node 15. For example, by comparing the current bandwidth usage with the maximum bandwidth capacity of DN_1 501, the CDN monitoring node 15 determines that DN_1 501 has no more available bandwidth left, i.e. DN_1 501 is at full capacity. By now, it is assumed that DN_1 501 is used to deliver CP2-VOD 522 as well (see FIG. 9).

In step 620, the CDN monitoring node 15 sends a request to DN_2 502 to get the current bandwidth usage at the node.

In step 622, DN_2 502 replies back with the bandwidth usage to the CDN monitoring node 15. For example, by comparing the bandwidth usage with the maximum bandwidth capacity of DN_2 502, the CDN monitoring node 15 determines that the bandwidth usage of DN_2 502 is at full capacity. By now, it is assumed that DN_2 502 is used to deliver CP2-VOD 522 as well (see FIG. 9).

In step 624, the LC 16 sends a request to DN_1 501 to collect its log files.

In step 626, DN_1 501 replies back to the LC 16 with its log files.

In step 628, the LC 16 sends a request to DN_2 502 to collect its log files.

In step 630, DN_2 replies back to the LC 16 with its log files.

In step 632, the LC 16 retrieves the records for each service by using the associated identifier (e.g. monitoring ID) and the service ID in all the received log files.

In step 634, the LC 16 removes the identifier from the records.

In step 636, the LC 16 sends a request to the file system (FS) 120 to publish the log files for analytics.

In step 638, the file system 120 sends a message back to the LC 16 for a successful publication.

In step 640, the CDN monitoring node 15 sends a request to LC 16 to query the log information for some specific services to be monitored, by providing their associated identifiers and service IDs. For example, in this case, the identifier and service ID associated with CP1-VOD 520 is included in the request.

In response to the request, the LC 16 fetches the log information corresponding to CP1-VOD 520, by filtering all the records based on the identifier and service ID associated with CP1-VOD 520. Then, the LC 16 sends the log information corresponding to CP1-VOD 520 to the CDN monitoring node 15, in step 642. The log information includes an indication of bandwidth usage.

In step 644, the CDN monitoring node 15 determines a required bandwidth to deliver the service to be monitored, based on the received log information. More specifically, the CDN monitoring node 15 calculates the bandwidth needed for delivering the services to be monitored, e.g. CP1-VOD 520. In this case, the log information shows that DN_1 501 has 10 Gbps and DN_2 502 has 50 Gbps. Compared with the predefined bandwidth of 100 Gbps, CP1-VOD 520 still needs 40 Gbps.

In step 646, the CDN monitoring node 15 checks if there is available bandwidth on the delivery nodes allocated or assigned to the services to be monitored.

In this example, DN_1 501 and DN_2 502 have reached their maximum bandwidth capacity, therefore, the CDN monitoring node 15 concludes that there is not enough bandwidth for CP1-VOD 520 to be running on those nodes. More specifically, the CDN monitoring node 15 compares the required bandwidth with the available bandwidth on the delivery nodes. In this case, the required bandwidth is greater than the available bandwidth.

Therefore, in step 648, the CDN monitoring node 15 can send a request to the Cloud Manager System (CLMS) 499 to launch a new virtual machine for offering a new delivery node, for example. Alternatively, the CDN monitoring node 15 can assign DN_3 503 to deliver CP1-VOD 520, in a non-cloud environment, for example. In response to the request, in step 650, CLMS 499 starts a new delivery node, such as DN_k 504, by launching a new virtual machine.

In step 652, DN_k 504 sends a "success" message back to CLMS 499 once it has been launched.

In step 654, CLMS 499 relays the "success" message to the CDN monitoring node 15.

In step 656, upon receipt of the "success" message, the CDN monitoring node 15 assigns the services to be monitored to DN_k 504. For example, CP1-VOD 520 is assigned to that delivery node.

In step 658, the CDN monitoring node 15 updates the service status in the database 120 for the services to be monitored. For example, the service status for CP1-VOD 520 shows that this service is miming on three delivery nodes, DN_1 501, DN_2 502 and DN_k 504.

In step 660, the database 120 replies back with a "success" message once the service status has been updated.

In step 662, the CDN monitoring node 15 sends a message to the RR 14 to notify it about the newly added resources (i.e. DN_k 504) for running the services to be monitored.

In acknowledgement to the notification, the RR 14 sends an 'accepted' message back to the CDN monitoring node 15. The RR 14 also adds the new delivery node (DN_k 504) in its service list of available delivery nodes.

Optionally, in step 666, the RR 14 can send a request to the database 121 to retrieve the service status information. In response to that request, the database 121 sends the requested information, in step 668.

In step 670, the end-user sends a request for another VOD from CP1 to the RR 14, for example.

In step 672, in response to the service request, the RR 14 checks the service list and determines that DN_k 504 has available bandwidth, through the CDN monitoring node 15. Thus, it selects this delivery node for redirection.

In step 674, the RR 14 sends a 307 message for a temporary direct to the end-user, the message including the address of DN_k.

After receiving the address of DN_k, the end-user sends his/her request for service to DN_k, in step 674.

In step 676, upon receipt of this request, DN_k, replies back by providing the service to the end-user.

Now, if in step 646, when the CDN monitoring node 15 checks if there is enough bandwidth for the services to be monitored, it can determine that there is available bandwidth on one delivery node or several delivery nodes put together. If one delivery node has enough available bandwidth to run the services to be monitored, then this delivery node is selected. But if the available bandwidth from individual delivery nodes is not enough but when putting all the available bandwidths together, the total available bandwidth is greater than the required bandwidth for the services to be monitored, then in that case, the services to be monitored are distributed among those delivery nodes for delivery.

As can be seen from FIG. 10, by using the service monitoring feature, the CDN monitoring node 15 has knowledge of bandwidth usage associated with a service, not just bandwidth associated with a node. As a result, the CDN monitoring node 15 can guarantee a service to be provided even though the available nodes are at full capacity or 2) different delivery nodes have available bandwidth but each available bandwidth is less than the bandwidth needed to deliver the service.

In case 1) the CDN monitoring node 15 can request for a new delivery node, which will provide the necessary bandwidth to deliver the service.

In case 2), the CDN monitoring node 15 can determine a certain number of delivery nodes to use in order to have a total bandwidth that is sufficient to deliver the service. By so doing, optimization of delivery nodes can be done.

Therefore, by using the service monitoring feature, end-users can experience a consistent level of QoE. As a result, CPs can attract more subscribers to consume their contents. Also, the network infrastructure is better utilized and is able to handle more services within the same delivery capacity, by allowing over-dimensioning of the service bandwidth usage.

Embodiments of the invention may be represented as a software product stored in a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the invention, which is defined solely by the claims appended hereto.

What is claimed is:

1. A method for monitoring services, in a content delivery network (CDN), having a plurality of delivery nodes used to deliver services requested by end-users, each service being identified by a service identity (ID) the method comprising:
   instructing the plurality of delivery nodes to associate identifiers to service requests, when the service requests arrive at any of the plurality of delivery nodes, the identifiers being logged with their associated service requests in log files;
   sending a request to a log collector for log information, the request including the service ID corresponding to a service to be monitored;
   in response to the request, receiving the log information corresponding to the service to be monitored based on the service ID and the associated identifier; and
   based on the received log information, determining a required bandwidth for delivering the service to be monitored.

2. The method of claim 1, wherein the log information comprises an indication of bandwidth usage of the service to be monitored and determining the required bandwidth for delivering the service to be monitored comprises comparing the bandwidth usage from the log information with a predefined bandwidth.

3. The method of claim 1, further comprising requesting a current bandwidth usage of delivery nodes assigned to the service to be monitored and determining an available bandwidth of the assigned delivery nodes, based on the current bandwidth usage of the delivery nodes assigned to the service to be monitored.

4. The method of claim 3, wherein determining the available bandwidth of the assigned delivery nodes comprises comparing the current bandwidth usage with a maximum bandwidth capacity of the assigned delivery nodes.

5. A network node for monitoring services, in a content delivery network (CDN), having a plurality of delivery nodes used to deliver services requested by end-users, each service being identified by a service identity (ID) the network node comprising circuitry adapted to cause the network node to:
   instruct the plurality of delivery nodes to associate identifiers to service requests, when the service requests arrive at any of the plurality of delivery nodes, the identifiers being logged with their associated service requests in log files;
   send a request to a log collector for log information, the request including the service ID corresponding to a service to be monitored;
   receive the log information corresponding to the service to be monitored, based on the service ID and the associated identifier; and
   determine a required bandwidth for delivering the service to be monitored, based on the received log information.

6. The network node of claim 5, wherein the circuitry comprises a processing unit, an interface and a memory, the memory containing instructions that, when executed, cause the processing unit to:

instruct the plurality of delivery nodes to associate identifiers to service requests, when the service requests arrive at any of the plurality of delivery nodes, the identifiers being logged with their associated service requests in log files;

send the request to the log collector for log information, the request including the service ID corresponding to the service to be monitored;

receive the log information corresponding to the service to be monitored, based on the service ID and the associated identifier; and determine the required bandwidth for delivering the service to be monitored, based on the received log information.

7. The network node of claim 6, wherein the processing unit further requests a current bandwidth usage of delivery nodes assigned to the service to be monitored.

8. The network node of claim 7, wherein the processing unit further determines an available bandwidth of the assigned delivery nodes, based on the current bandwidth usage of the delivery nodes assigned to the service to be monitored.

9. The network node of claim 8, wherein the processing unit determines the available bandwidth of the assigned delivery nodes by comparing the current bandwidth usage with a maximum bandwidth capacity of the assigned delivery nodes.

10. The network node of claim 8, wherein the processing unit further determines that the available bandwidth of the assigned delivery nodes is greater than the required bandwidth for delivering the service to be monitored.

11. The network node of claim 8, wherein the processing unit determines that the available bandwidth of the assigned delivery nodes is less than the required bandwidth for delivering the service to be monitored.

12. The network node of claim 7, wherein the processing unit further selects at least one of the assigned delivery nodes for delivering the service to be monitored.

13. The network node of claim 7, wherein the processing unit further determines that the assigned delivery nodes have no available bandwidth left.

14. The network node of claim 7, wherein the processing unit further updates a blacklist of delivery nodes to contain the assigned delivery nodes.

15. The network node of claim 6, wherein the processing unit instructs a cloud manager to launch a new virtual machine to deliver the service to be monitored.

16. The network node of claim 15, wherein the processing unit updates a service status for the service to be monitored, wherein the service status shows the service to be monitored running on the new virtual machine.

17. The network node of claim 6, wherein the processing unit further instructs the plurality of delivery nodes to add an identifier into an Uniform Resource Locator (URL) in the service requests.

18. The network node of claim 6, wherein the processing unit further detects that one delivery node is reaching a load threshold, prior to instructing the plurality of delivery nodes to associate identifiers to service requests.

19. The network node of claim 6, wherein the log information comprises an indication of bandwidth usage of the service to be monitored.

20. The network node of claim 19, wherein the processing unit determines the required bandwidth for delivering the service to be monitored by comparing the bandwidth usage from the log information with a predefined bandwidth.

* * * * *